United States Patent
Brown et al.

(10) Patent No.: US 7,059,555 B2
(45) Date of Patent: *Jun. 13, 2006

(54) TAPE REEL ASSEMBLY WITH RADIALLY SYMMETRIC DEFORMING TAPE WINDING SURFACE

(75) Inventors: Jerome D. Brown, Wahpeton, ND (US); Jerry L. Alexander, St. Paul Park, MN (US); Dean E. Sitz, Wahpeton, ND (US); Peter A. Ridl, Oakdale, MN (US); Michael E. Reard, Fergus Falls, MN (US)

(73) Assignee: Imation Corp., Oakdale, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/672,166

(22) Filed: Sep. 26, 2003

(65) Prior Publication Data

US 2005/0077408 A1    Apr. 14, 2005

(51) Int. Cl.
*G11B 23/107* (2006.01)

(52) U.S. Cl. ............ 242/348; 242/608.8; 242/610.6; 242/613; 242/613.4; 360/132

(58) Field of Classification Search ........... 242/345, 242/345.2, 348, 608.8, 610.6, 613.4, 613.5, 242/613; 360/132

See application file for complete search history.

(56) References Cited

U.S. PATENT DOCUMENTS

| 6,474,582 | B1 | 11/2002 | Zwettler et al. |
| 6,736,345 | B1 * | 5/2004 | Hiraguchi et al. ....... 242/345.2 |
| 2002/0084379 | A1 | 7/2002 | Morita |

* cited by examiner

*Primary Examiner*—John Q. Nguyen
(74) *Attorney, Agent, or Firm*—Eric D. Levinson (57) ABSTRACT

A tape reel assembly for a data storage tape cartridge is described. The tape reel assembly has a hub. The hub includes a cylindrical core, an annular arm, and a web. The cylindrical core defines a drive side and a top side. The annular arm is co-axially disposed exterior to and separated from the cylindrical core. Additionally, the annular arm defines a tape winding surface bisected by a center line into a top half opposite the drive side and a bottom half adjacent the drive side. The web extends from the top side of the core, and a web center connects to the annular arm at a point in the top half.

17 Claims, 5 Drawing Sheets

TAPE REEL ASSEMBLY WITH RADIALLY SYMMETRIC DEFORMING TAPE WINDING SURFACE

THE FIELD OF THE INVENTION

The present invention generally relates to a tape reel assembly for a data storage tape cartridge. More particularly, it relates to a tape reel assembly having radially symmetrically deforming tape winding surface.

BACKGROUND OF THE INVENTION

Data storage tape cartridges have been used for decades in the computer, audio, and video fields. The data storage tape cartridge continues to be an extremely popular device for recording large volumes of information for subsequent retrieval and use.

A data storage tape cartridge generally consists of an outer shell or housing maintaining at least one tape reel assembly and a length of magnetic storage tape. The storage tape is wrapped about a hub portion of the tape reel assembly and is driven through a defined path by a driving system. The housing normally includes a separate cover and a separate base. Together, the cover and base form an opening (or window) at a forward portion thereof permitting access to the storage tape by a read/write head upon insertion of the data storage tape cartridge into the tape drive. The interaction between the storage tape and head occurs within the housing for a mid-tape load design. Conversely, the interaction between the storage tape and head occurs outside of the housing at a location where the read/write head is annexed for a helical drive design or a leader block design. Where the tape cartridge/drive system is designed to direct the storage tape away from the housing, the data storage tape cartridge normally includes a single tape reel assembly. Alternately, where the tape cartridge/drive system is designed to provide head/storage tape interaction within the housing, a two (or dual) tape reel configuration is typically employed.

Regardless of the number of tape reel assemblies associated with a particular data storage tape cartridge, the tape reel assembly itself is generally comprised of three basic components: an upper flange, a lower flange, and a hub. The hub forms a tape winding surface about which the storage tape is wound. The flanges are disposed at opposite ends of the hub, and are spaced apart to accommodate a width of the storage tape. To reduce the likelihood of the storage tape undesirably contacting one of the flanges during a winding operation, the flange-to-flange spacing is selected to be slightly greater than the width of the tape. However, even when the flanges are so spaced, successive layers of wrapped storage tape can eventually cause the tape winding surface to deform radially inward. In particular, prior art tape reel assemblies have tape winding surfaces that deform in a non-uniform manner. For example, the deformation of the prior art tape winding surfaces can vary widely between the flanges, deforming more near the upper flange, for instance, and less near the lower flange (or vice versa). One consequence of this skewed deformation of the tape winding surface is variation in a transverse tension gradient, and a skewing of the storage tape during winding and unwinding. Significantly, skewed, or non-symmetric, deformation of the tape winding surface can lead to tape failure (e.g., popped strands) or read/write errors. As a point of reference, during wind up, a high frequency lateral movement of the storage tape can be created, leading to potential servo-tracking errors.

Tape reel assemblies are typically formed from plastic components. Though cost effective, plastic hubs can deform in a skewed manner under the compressive forces associated with successive windings of storage tape. Consumers generally prefer storing as much information as possible in one data storage tape cartridge. This consumer preference translates to wrapping more and more storage tape on a tape reel assembly/assemblies. In the case of a single reel data storage tape cartridge, all of the storage tape is by necessity wound about only one reel. The large number of tape windings directly correlates to a large tape winding force on the hub. Accordingly, tape reel assemblies, and in particular single reel assemblies, are vulnerable to the skewed deformation of the tape winding surface which can contribute to servo-tracking errors.

Previously, the storage tape displacement identified above was of minimal concern as the servo-track associated with the storage tape was sufficiently sized to account for variations in lateral displacement. In general terms, the servo-track provides a baseline by which the read/write head can ascertain a "position" of the storage tape. The servo-track width had previously been sufficient to accommodate the lateral movement associated with a typical number of storage tape windings about the hub. However, evolution of tape cartridge/tape drive technology has resulted in more compact designs characterized by smaller track widths, including the servo-track width. The reduced width servo-track has a limited frequency (or lateral displacement) response. Therefore, the above-described skewed deformation of the winding surface can lead to displacement of the storage tape beyond the bandwidth of the now smaller sized servo-track. This, in turn, contributes to servo-tracking errors.

Data storage tape cartridges are useful tools suitable for storing vast amounts of information. With increasing speeds of reading/writing and advanced magnetic tape technology, design of the data storage tape cartridge is directed to providing accurate and consistent storage tape positioning. To this end, skewed deformation of the tape winding surface can result in deformation of the storage tape creating errors in reading from, and writing to, the storage tape. Therefore, a need exists for a tape reel assembly configured to provide symmetric deformation of the tape winding surface.

SUMMARY OF THE INVENTION

One aspect of the present invention relates to a tape reel assembly for a data storage tape cartridge. The tape reel assembly has a hub. The hub includes a cylindrical core, an annular arm, and a web. The cylindrical core defines a drive side and a top side. The annular arm is co-axially disposed exterior to and separated from the cylindrical core. Additionally, the annular arm defines a tape winding surface bisected by a center line into a top half opposite the drive side and a bottom half adjacent the drive side. The web extends from the top side of the core, and a web center connects to the annular arm at a point in the top half.

Another aspect of the present invention relates to a data storage tape cartridge. The cartridge includes a housing defining an enclosed region, at least one tape reel assembly rotatably disposed within the enclosed region, and a storage tape coupled with the tape reel assembly. The tape reel assembly includes a hub including a cylindrical core, an annular arm, and a web. The cylindrical core defines a drive side and a top side. The annular arm is co-axially disposed exterior to and separated from the cylindrical core. Additionally, the annular arm defines a tape winding surface bisected by a center line into a top half opposite the drive side and a bottom half adjacent the drive side. The web extends from the top side of the core, and a web center connects to the annular arm at a point in the top half. The storage tape is configured to wind about the tape winding surface.

Yet another aspect of the present invention relates to a method of winding data storage tape onto a tape reel assembly. The method includes providing a data storage tape cartridge having a housing enclosing the tape reel assembly. In particular, the tape reel assembly includes a hub having a cylindrical core, an annular arm, and a web. The cylindrical core defines a drive side and a top side. The annular arm is co-axially disposed exterior to and separated from the cylindrical core. Additionally, the annular arm defines a tape winding surface bisected by a center line into a top half opposite the drive side and a bottom half adjacent the drive side. The web extends from the top side of the core, and a web center connects to the annular arm at a point in the top half. The method additionally includes contacting the tape winding surface of the hub with a storage tape. The method further includes rotating the tape reel assembly such that the storage tape wraps about the hub and applies a stress of at least 400 pounds per square inch to the tape winding surface. The method ultimately includes configuring the tape winding surface to exhibit approximately symmetrical radial deformation in response to the applied stress.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION OF THE PREFERRED EMBODIMENTS

Figure 1:
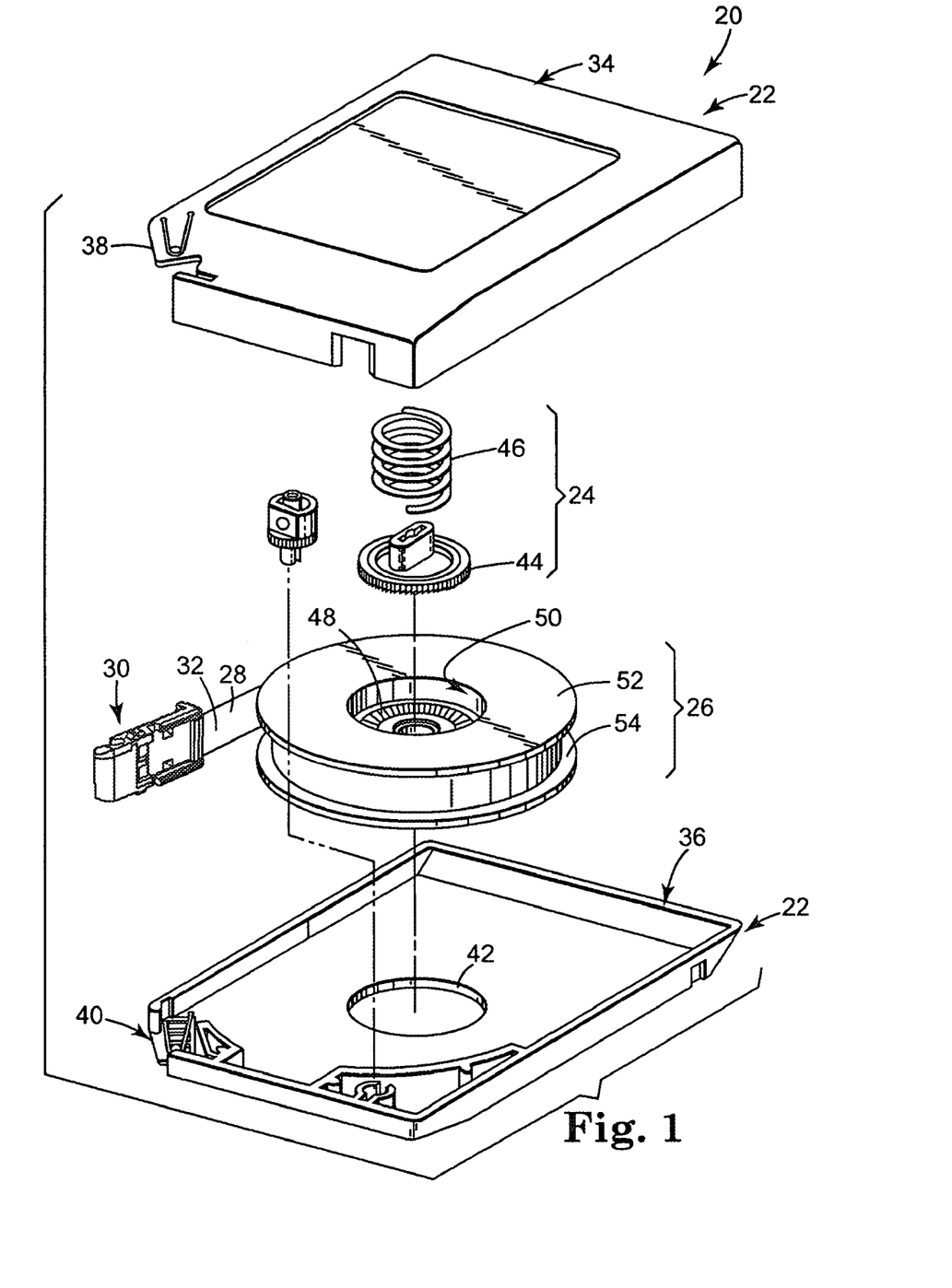
FIG. 1 is a perspective, exploded view of a single reel data storage tape cartridge showing an embodiment of a tape reel assembly in accordance with the present invention.

An exemplary single reel data storage tape cartridge according to one embodiment of the present invention is illustrated at 20 in FIG. 1. Generally, the single reel data storage tape cartridge 20 includes a housing 22, a brake assembly 24, a single tape reel assembly 26, a storage tape 28, and a leader block 30. The single tape reel assembly 26 is disposed within the housing 22. The storage tape 28, in turn, is wound about the single tape reel assembly 26 and includes a leading end 32 attached to the leader block 30. As a point of reference, while a single reel data storage tape cartridge 20 is shown, the present invention is equally applicable to other cartridge configurations, such as a dual reel cartridge.

The housing 22 is sized to be received by a typical tape drive (not shown). Thus, the housing 22 exhibits a size of approximately 125 mm×110 mm×21 mm, although other dimensions are equally acceptable. With this in mind, the housing 22 is defined by a first housing section 34 and a second housing section 36. In one embodiment, the first housing section 34 forms a cover whereas the second housing section 36 forms a base. As used throughout the specification, directional terminology such as "cover," "base," "upper," "lower," "top," "bottom," etc., is employed for purposes of illustration only and is in no way limiting.

The first and second housing sections 34 and 36, respectively, are sized to be reciprocally mated to one another and are generally rectangular, except for one corner 38 that is preferably angled and forms a tape access window 40. The tape access window 40 serves as an opening for the storage tape 28 to exit from the housing 22 such that the storage tape 28 can be threaded to a tape drive (not shown) when the leader block 30 is removed from the tape access window 40. Conversely, when the leader block 30 is engaged in the tape access window 40, the tape access window 40 is covered.

In addition to forming a portion of the tape access window 40, the second housing section 36 also forms a central opening 42. The central opening 42 facilitates access to the single tape reel assembly 26 by a drive chuck portion of the tape drive (not shown). During use, the drive chuck portion disengages the brake assembly 24 prior to rotating the tape reel assembly 26 for access to the storage tape 28. The brake assembly 24 is of a type known in the art and generally includes a brake 44 and a spring 46 co-axially disposed within the tape reel assembly 26. When the data storage tape cartridge 20 is idle, the brake assembly 24 is engaged and meshes with a brake interface 48 to selectively "lock" the single tape reel assembly 26 to the housing 22. In one embodiment, the brake interface 48 is a gear having teeth. Alternatively, other brake configurations are equally acceptable.

The storage tape 28 is preferably a magnetic tape of a type commonly known in the art. For example, the storage tape 28 may consist of a balanced polyethylene naphthalate (PEN) based material coated on one side with a layer of magnetic material dispersed within a suitable binder system and coated on the other side with a conductive material dispersed within a suitable binder system. Acceptable magnetic tape is available, for example, from Imation Corp., of Oakdale, Minn.

The leader block 30 covers the tape access window 40 and facilitates retrieval of the storage tape 28. In general terms, the leader block 30 is shaped to conform to the window 40 of the housing 22 and to cooperate with the tape drive (not shown) by providing a grasping surface for the tape drive to manipulate in delivering the storage tape 28 to the read/write head. In this regard, the leader block 30 can be replaced by other components, such as a dumb-bell shaped pin. Moreover, the leader block 30, or a similar component, can be eliminated entirely, such as with a dual reel cartridge design.

With reference to FIG. 1, the tape reel assembly 26 comprises a hub 50, an upper flange 52, and a lower flange 54. In one embodiment, the hub 50 defines the brake interface 48. The upper and lower flanges 52, 54 extend in a radial fashion from opposing sides of the hub 50, respectively. In one embodiment, the hub 50 and the flanges 52, 54 cooperate to retain multiple wraps of the storage tape 28 around the hub 50 and between the flanges 52, 54. The form and function of the tape reel assembly 26 is more completely described with reference to FIG. 2 below.

Figure 2:
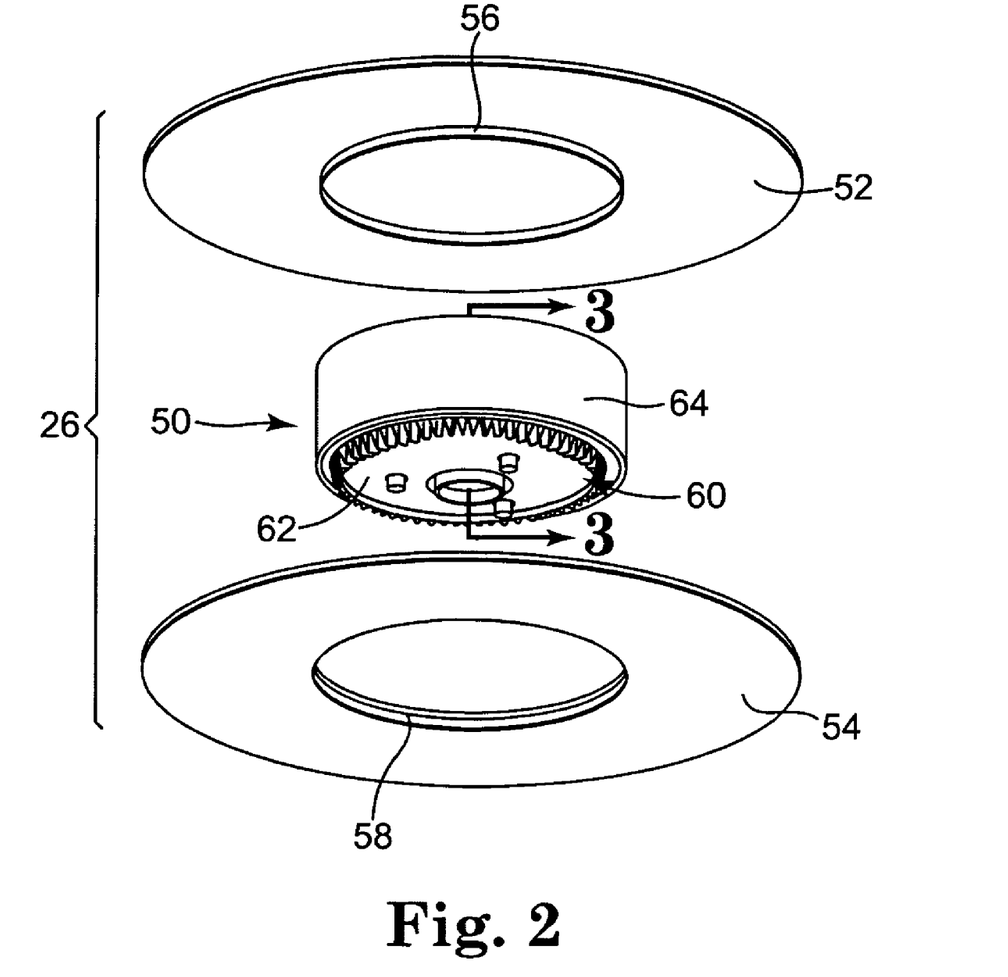
FIG. 2 is an exploded view of a three-piece tape reel assembly including a hub according to one embodiment of the present invention.

The tape reel assembly 26 according to one embodiment of the present invention is illustrated in FIG. 2. The tape reel assembly 26 is comprised of the hub 50 and the upper and lower flanges 52, 54. As such, the tape reel assembly 26 is a three-piece assembly. In one embodiment, the upper flange 52 and the lower flange 54 are formed separately and subsequently attached to the hub 50. To this end, the upper flange 52 defines a first interior rim 56 configured to mate to the hub 50. Similarly, the lower flange 54 defines a second interior rim 58 configured to mate with an opposing side of the hub 50. Alternatively, other mating configurations can be employed. Regardless, the hub 50 defines a drive side 62 and a tape winding surface 64. The storage tape 28 (FIG. 1) is wrapped about the hub 50 and, in particular, the tape winding surface 64. Notably, where the cartridge 20 (FIG. 1) is a belt driven design, the opposing flanges 52, 54 are not necessary to maintain the storage tape 28, and can, therefore, be eliminated. In the broadest sense, the tape reel assembly 26 can consist of the hub 50 alone. The novel hub 50 is more fully described in FIG. 3 below.

Figure 3:
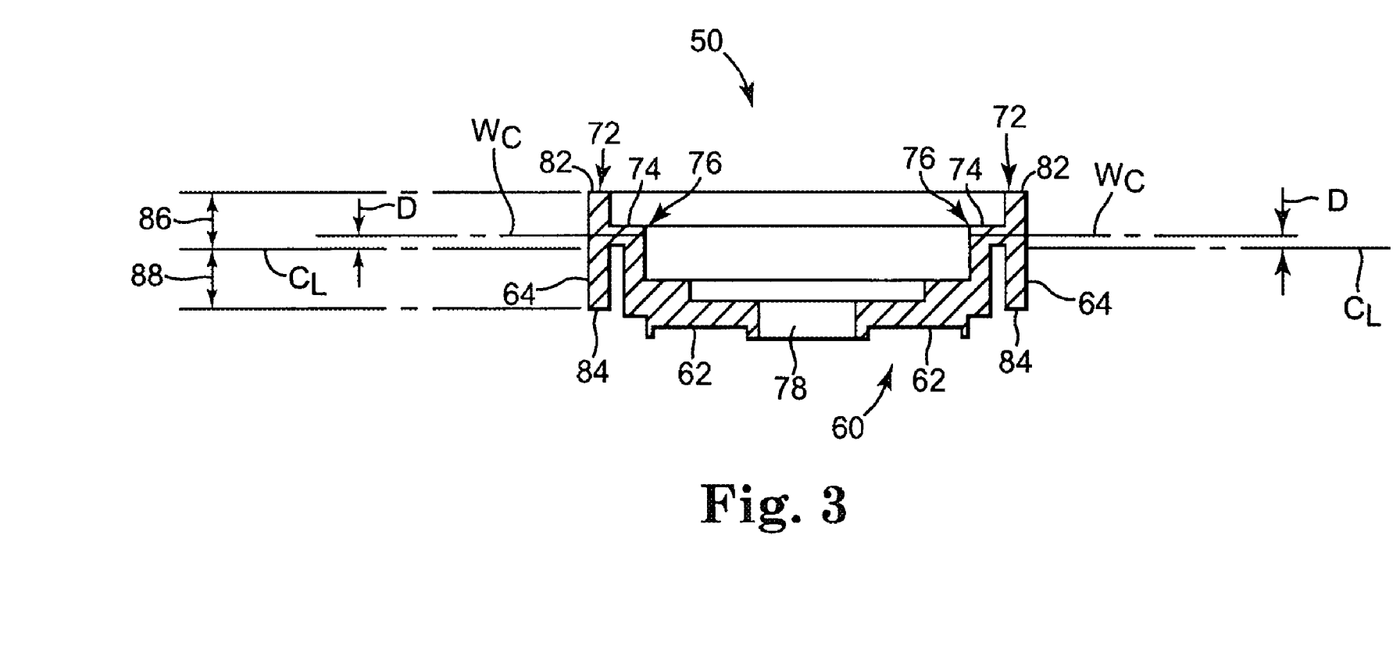
FIG. 3 is a cross-sectional view of the hub shown in FIG. 2.

A cross-sectional view of the hub 50 is illustrated in FIG. 3. The hub 50 includes a cylindrical core 60, an annular arm 72, and a web 74. The cylindrical core 60 defines the drive side 62, a top side 76, and a central bore 78. The annular arm 72 is co-axially disposed exterior to and separated from the cylindrical core 60, and defines the tape winding surface 64. Finally, the web 74 extends from the top side 76 of the cylindrical core 60 and connects to the annular arm 72.

As illustrated in FIG. 3, the annular arm 72 forms the tape winding surface 64 to include a first end 82 and a second end 84. A center line $C_L$ is defined that bisects the tape winding surface 64 midway between the ends 82, 84 into a top half 86 and a bottom half 88. The top half 86 is positioned opposite the drive side 62, whereas the bottom half 88 is positioned adjacent the drive side 62. Additionally, the web 74 has a web center $W_C$. In one embodiment, the web 74 extends from the top side 76 of the cylindrical core 60 such that the web center $W_C$ connects to the annular arm 72 at a point in the top half 86, a distance D from the center line $C_L$. In one embodiment, the distance D is not greater than one-half an axial length of the top half 86 (i.e., not greater than one-fourth of the axial length of the tape winding surface 64). In a more preferred embodiment, the distance D is not greater than one-fourth the axial length of the top half 86 (i.e., not greater than one-eighth of the axial length of the tape winding surface 64). In another embodiment, the distance D is selected to be in the range of 0–0.2 inch. In another embodiment, the distance D is selected to be not greater than 0.1 inch. In a preferred embodiment where the hub 50 is adapted for use in handling one-half inch tape, the distance D is 0.050 inch. Significantly, it has been discovered that for the distance D within the parameters defined above, upon loading, the tape winding surface 64 exhibits approximately symmetrical radial deformation along each half 86, 88.

As employed in this detailed description, "approximately symmetrical radial deformation" along the tape winding surface 64 is defined to mean a variation in the deformation of the tape winding surface 64 along an axial length thereof of not more than 0.0002 inch per 100 psi of radial pressure, as determined, for example by finite element analysis or other testing techniques. That is to say, the radial deformation of the tape winding surface 64 along the top half 86 (or any point thereof), for example, could exceed the radial deformation along the bottom half 88 (or any point thereof) by up to 0.0002 inch per 100 psi of radial pressure and the tape winding surface 64 would be characterized as having approximately symmetrical radial deformation across the tape winding surface 64. In a more preferred embodiment, "approximately symmetrical radial deformation" is defined to mean a variation of less than 0.0001 inch per 100 psi of radial pressure. In a further preferred embodiment, it has surprisingly been found that by positioning the web 74 in accordance with the above-defined parameters, the radial deformation of the tape winding surface 64 is not only approximately radially symmetric, but is also uniform along a length of the tape winding surface 64.

Figure 4:
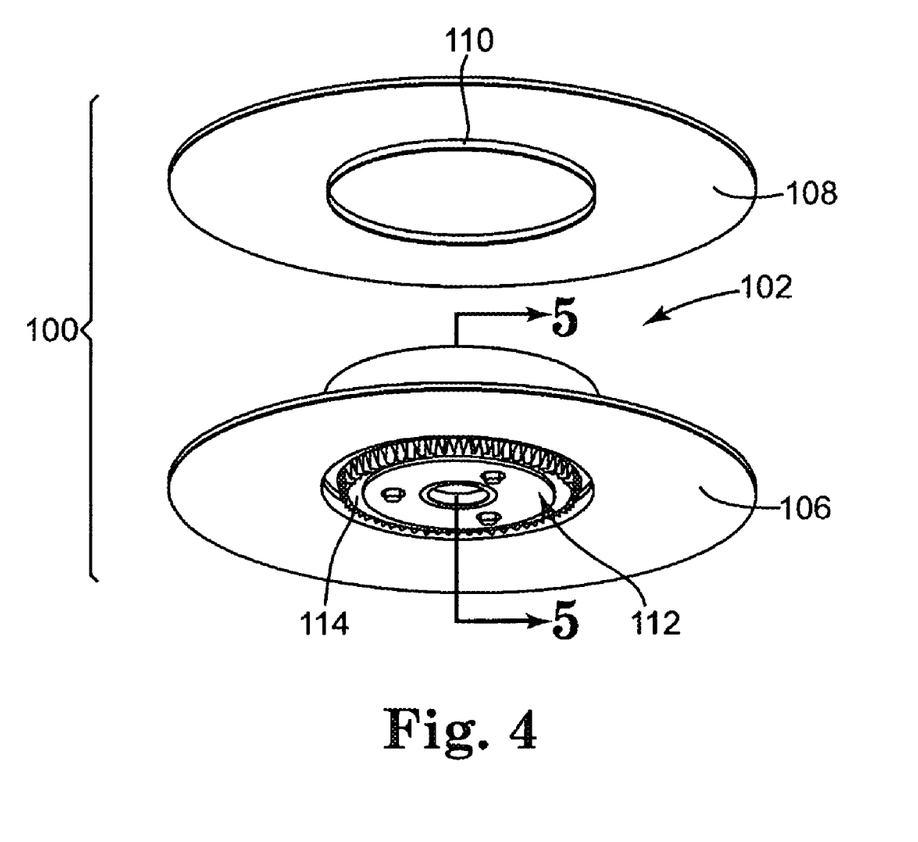
FIG. 4 is an exploded view of a two-piece tape reel assembly including a hub having a flange according to one embodiment of the present invention.

Another tape reel assembly according to one embodiment of the present invention is illustrated at 100 in FIG. 4. The tape reel assembly 100 comprises a hub 102, a first flange 106 formed integrally with the hub 102, and a second flange 108. As such, the tape reel assembly 100 is a two-piece assembly. The second flange 108 is provided with a rim 110 configured for attachment to the hub 102. In a preferred embodiment, the second flange 108 is attached to the hub 102 via a laser weld. Alternatively, other attachment techniques can be employed. Regardless, the hub 102 includes a cylindrical core 112 defining a drive side 114 as described in the cross-sectional view below.

Figure 5:
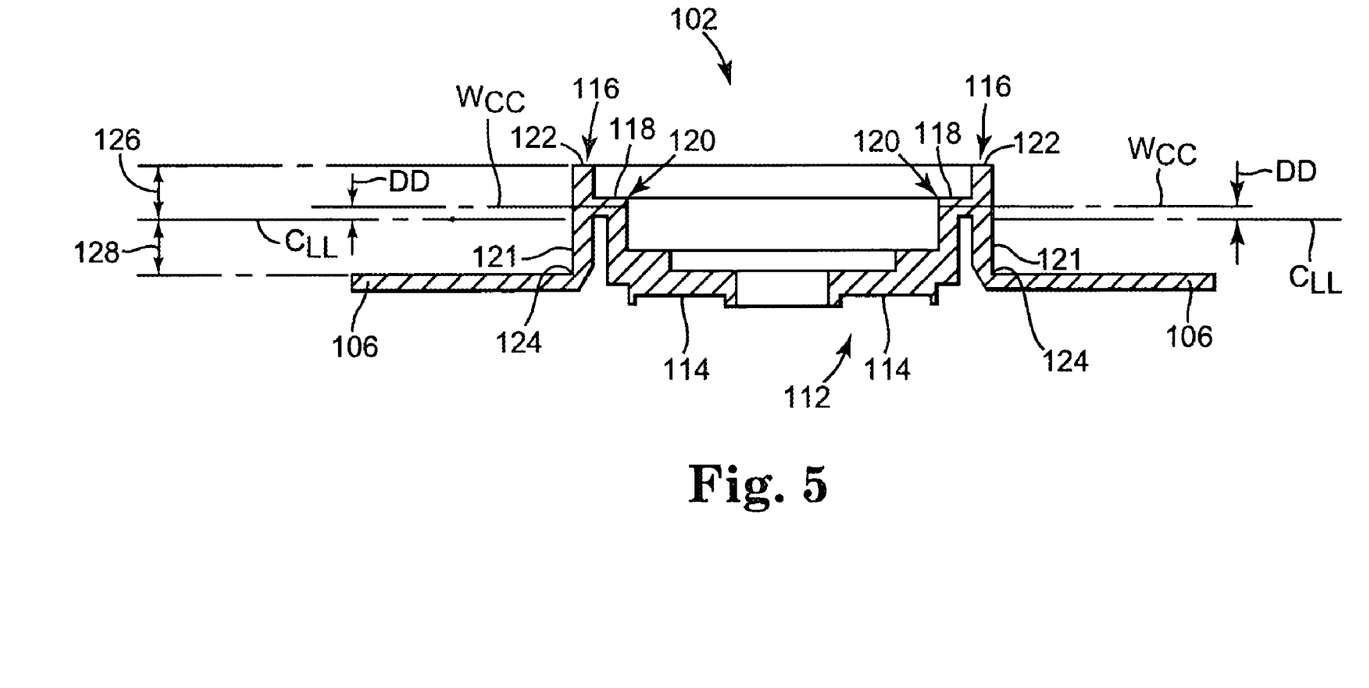
FIG. 5 is a cross-sectional view of the hub shown in FIG. 4.

A cross-sectional view of the hub 102 is illustrated in FIG. 5. The hub 102 includes the cylindrical core 112, an annular arm 116, and a web 118 connecting the cylindrical core 112 to the annular arm 116. The cylindrical core 112 defines the drive side 114 and a top side 120. The annular arm 116 is co-axially disposed exterior to and separated from the cylindrical core 112. The annular arm 116 defines a tape winding surface 121 having a first end 122 and a second end 124. A center line $C_{LL}$ is defined that bisects the tape winding surface 121 midway between the ends 122, 124 into a top half 126 and a bottom half 128. The top half 126 is positioned opposite the drive side 114, whereas the bottom half 128 is positioned adjacent the drive side 114. Additionally, the web 118 has a web center $W_{CC}$. In one embodiment, the web 118 extends from the top side 120 of the cylindrical core 112 such that the web center $W_{CC}$ connects to the annular arm 116 at a point in the top half 126 a distance DD from the center line $C_{LL}$. In one embodiment, the distance DD is not greater than one-half an axial length of the top half 126. In another embodiment, the distance DD is selected to be in the range of 0–0.2 inch. In another embodiment, the distance DD is selected to be not greater than 0.1 inch. In a preferred embodiment, the distance DD is 0.050 inch.

In one embodiment, the first flange 106 is attached to the annular arm 116 at the second end 124, such that the first flange 106 is adjacent to the drive side 114 of the cylindrical core 112. The first flange 106 extends in a radial fashion away from the tape winding surface 121.

As described above, the tape reel assembly 100 is a two-piece assembly comprising the hub 102 having the first flange 106 connected thereto, and the discrete second flange 108. When assembled, the first and second flanges 106, 108, respectively, extend in a radial fashion from opposing sides of the hub 102. During use, as the storage tape 28 (FIG. 1) is wrapped about the tape winding surface 121, a compressive force is exerted radially inward to the hub 102 causing a deformation of the tape winding surface 121. It has been newly discovered and described herein that a selected positioning of the web 118 between the cylindrical core 112 and the annular arm 116 can be optimized such that the deformation of the tape winding surface 121 is symmetric. In particular, the radial deformation of the tape winding surface 121 on either side of the centerline $C_{LL}$ can be made equal by the position of the web center $W_{CC}$ relative to the annular arm 116.

EXAMPLES

The following examples further describe the tape reel assemblies of the present invention, methods of forming the tape reel assemblies, and the tests performed to determine various characteristics thereof. The examples are provided for exemplary purposes to facilitate an understanding of the invention, and should not be construed to limit the inventions to the examples.

Example 1

A tape reel assembly according to the description of FIGS. 2 and 3 was analyzed. In particular, a three-piece tape reel assembly for use with half-inch tape with the flanges and hub formed of a 20% glass-filled polycarbonate material was analyzed via finite element analysis. With reference to the element numbering of FIG. 3, the hub 50 of Example 1 was defined such that the distance D between the web center line $W_C$ and the tape winding surface center line $C_L$ was 0.050 inch. Employing finite element analysis, a radial load of approximately 500 pounds per square inch was applied to the tape winding surface, and the radial deformation along the tape winding surface was determined. A maximum deformation of the tape winding surface of approximately 0.0032 inch was determined at the center line $C_L$. Immediately adjacent to the first and second ends of the tape winding surface 64, a radial deformation of 0.0028 inch was analyzed. Hence, under a load, the radial deformation of the tape winding surface varied between the ends only by an amount of 0.0004 inch, which is to say the radial deformation of the tape winding surface 64 was approximately radially symmetric, as based upon radial deformation variation per 100 psi, the tape reel of Example 1 exhibited a variation in radial deformation of 0.0000008 inch.

With the same 500 psi radial loading described above, the deformation of the flanges was also analyzed and found to be 0.010 inch at the outermost peripheries of both flanges. Thus, the tape reel assembly exhibited symmetrical deformation at the flanges. Notably, flange deformation can also be measured in the following manner. A tape reel assembly having a hub fully loaded with storage tape is fixed into a test stand. The flange position relative to the fixed top of the test stand is measured in four locations around the tape reel assembly. The measurements are taken near the outer periphery of the flange. The storage tape is sequentially and entirely removed from the hub. The flange position relative to the fixed top of the test stand was again recorded at four locations. Hence, the flange deformation is measured by comparing the flange position when the hub is loaded with storage tape and the flange position when the hub is not loaded with storage tape. The above dimensions were obtained for half-inch wide storage tape. Proportional dimensions can be attained for other tape formats using finite element analysis or other analytical techniques.

Example 2

A second tape reel assembly for use with half-inch tape was analyzed according to the description of FIGS. 4 and 5. In particular, a two-piece tape reel assembly with the hub and the flanges formed of 20% glass-filled polycarbonate was analyzed via finite element analysis. With reference to the element numbering of FIG. 5, the hub 102 was defined such that the distance DD web center line $W_{CC}$ and the tape winding surface center line $C_{LL}$ was 0.050 inch. A radial load of approximately 500 pounds per square inch was applied, via finite element analysis, to the tape winding surface and radial deformation was determined. The tape winding surface deformed in a symmetric manner having a maximum deformation of 0.009 inch at the centerline $C_{LL}$, and equal deformation of 0.006 inch adjacent each of the flanges. Thus, the tape reel of Example 2 exhibited approximately symmetrical radial deformation. The above dimensions were obtained for half-inch wide storage tape. Proportional dimensions can be attained for other tape formats using finite element analysis or other analytical techniques.

Although specific embodiments have been illustrated and described herein, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A tape reel assembly for a data storage tape cartridge, the cartridge configured to couple to a tape drive, the tape reel assembly comprising:
   a hub comprising an upper flange and a lower flange, the upper and lower flanges extending in a radial fashion from opposing sides of the hub, respectively, the hub including:
      a cylindrical core defining a drive side and a top side;
      an annular arm co-axially disposed exterior to and separated from the cylindrical core, the annular arm defining opposing end surfaces and a tape winding surface bisected by a center line into a top half opposite the drive side and a bottom half adjacent the drive side; and
      a web extending from the top side of the core and connecting to the top half of the annular arm, and further wherein the web is not contiguous with the end surfaces of the annular arm;
   wherein the upper and lower flanges exhibit symmetrical deformation upon application of a radial load to the tape winding surface.

2. The tape reel assembly of claim 1, wherein the hub is configured such that upon loading, the tape winding surface exhibits approximately symmetrical radial deformation.

3. The tape reel assembly of claim 2, wherein the hub is configured to exhibit a variation in radial deformation between the top and bottom halves of not more than 0.0002 inch per 100 psi of applied radial load.

4. The tape reel assembly of claim 3, wherein the hub is configured to exhibit a variation in radial deformation between the top and bottom halves of not more than 0.0001 inch per 100 psi of applied radial load.

5. The tape reel assembly of claim 1, wherein the web defines a web center, the web center connecting to the annular arm at a point from the center line not greater than one-half an axial length of the top half.

6. The tape reel assembly of claim 1, wherein the web defines a web center, the web center connecting to the annular arm at a point from the center line not greater than one-fourth an axial length of the top half.

7. The tape reel assembly of claim 1, wherein the web defines a web center, the web center connecting to the annular arm at a point approximately 0.05 inch from the center line.

8. The tape reel assembly of claim 1, wherein the web defines a web top and a web bottom, and further wherein the web top is aligned with the top side of the core.

9. The tape reel assembly of claim 1, wherein an entirety of the web is spaced apart from the opposing end surfaces of the annular arm.

10. The tape reel assembly of claim 1, wherein at least one of the upper flange and the lower flange is formed as part of the annular arm.

11. The tape reel assembly of claim 1, wherein at least one of the upper flange and the lower flange is laser welded to the arm.

12. A data storage tape cartridge comprising:
   a housing defining an enclosed region;
   at least one tape reel assembly rotatably disposed within the enclosed region and including a hub comprising an upper flange and a lower flange, the upper and lower flanges extending in a radial fashion from opposing sides of the hub, respectively, and at least one of the upper flange and the lower flange is laser welded to the hub, the hub having:
      a cylindrical core defining a drive side and a top side;
      an annular arm co-axially disposed exterior to and separated from the cylindrical core, the annular arm defining a tape winding surface bisected by a center line into a top half opposite the drive side and a bottom half adjacent the drive side;
      a web extending from the top side of the core and connecting to the top half of the annular arm, wherein the web is not contiguous with either of the opposing end surfaces; and
   storage tape configured to wind about the tape winding surface.

13. The tape reel assembly of claim 12, wherein the hub is configured such that upon loading, the tape winding surface exhibits approximately symmetrical radial deformation.

14. The data storage tape cartridge of claim 12, wherein the web defines a web center, the web center connecting to the annular arm at a point from the center line not greater than one-fourth an axial length of the top half.

15. The data storage tape cartridge of claim 12, wherein at least one of the upper flange and the lower flange is formed as part of the annular arm.

16. The data storage tape cartridge of claim 12, wherein the upper and lower flanges exhibit symmetrical deformation.

17. A method of winding data storage tape onto a tape reel assembly comprising:
   providing a data storage tape cartridge having a housing enclosing the tape reel assembly, wherein the tape reel assembly includes a hub comprising an upper flange and a lower flange, the upper and lower flanges extending in a radial fashion from opposing sides of the hub, respectively, the hub having:
      a cylindrical core defining a drive side and a top side;
      an annular arm co-axially disposed exterior to and separated from the cylindrical core, the annular arm defining a tape winding surface bisected by a center line into a top half terminating at a top end surface opposite the drive side and a bottom half adjacent the drive side; and
      a web extending from the top side of the core and connecting to the top half of the annular arm, wherein the web is characterized as being not contiguous with the top end surface of the annular arm;
   contacting the tape winding surface with a storage tape; and
   rotating the tape reel assembly such that the storage tape wraps about the hub and applies a stress of at least 400 pounds per square inch to the tape winding surface;
   wherein the tape winding surface and the upper and lower flanges exhibits approximately symmetrical radial deformation in response to the applied stress.

* * * * *